United States Patent [19]

Mingione

[11] Patent Number: 6,020,017

[45] Date of Patent: Feb. 1, 2000

[54] NON-DAIRY DRINK MIXTURE

[76] Inventor: Armand Mingione, 2117 Alexander Dr., Escondido, Calif. 92025

[21] Appl. No.: 09/104,851

[22] Filed: Jun. 25, 1998

[51] Int. Cl.[7] .............................. A23C 17/00; A23L 2/00; A23D 7/00
[52] U.S. Cl. ........................... 426/590; 426/583; 426/613
[58] Field of Search .................................... 426/590, 650, 426/601, 602, 580, 583

[56] References Cited

U.S. PATENT DOCUMENTS

| | | | |
|---|---|---|---|
| 3,620,757 | 11/1971 | Ellinger et al. | 426/583 |
| 4,046,926 | 9/1977 | Gardiner | 426/585 |
| 4,859,484 | 8/1989 | Bielskis et al. | 426/656 |
| 5,024,849 | 6/1991 | Rasilewicz | 426/601 |
| 5,478,587 | 12/1995 | Mingione | 426/565 |

OTHER PUBLICATIONS

Condensed Chemical Dictionary, 7th Edition. pp. 873 and 933, 1969.
Database Abstract. AN 77–24515Y [14] WPIDS. JP 52025058, Feb. 24, 1977.

*Primary Examiner*—Anthony J. Weier
*Attorney, Agent, or Firm*—Snell & Wilmer; Henry G. Kohlmann

[57] ABSTRACT

In a powdered milk substitute the mixture with the taste and processing characteristics of milk but without lactose ingredients which when reconstituted into a liquid form may be processed like any milk product and subjected to the heat required for pasteurization without the suspended ingredients settling out, thereby permitting an extended shelf life of the reconstituted liquid. The mixture includes whey, partially hydrogenated oil, corn syrup solids, a stabilizer emulsifier, and other ingredients which resists high temperature breakdown during pasteurization. The product composition may be varied to produce a non-fat version in accordance with USDA regulations, a flavored version (such as a chocolate drink) and a regular version each of which is of a high temperature variey which permits pasteurization or sterilization by heat.

19 Claims, No Drawings

NON-DAIRY DRINK MIXTURE

BACKGROUND OF THE INVENTION

1. Field of the Invention

This invention relates generally to the field of milk like drinks and milk substitutes. More particular this invention relates to milk like drinks and milk substitutes which can be shipped in dry form and which when reconstituted may be processed in the same manner as milk.

2. Related Art

Many dehydrated or powdered milk products exist in the prior art. These have extended shelf life when in the dry state as compared to milk and can be reconstituted into a milk drink when required. Lactose free products are also available which can also be stored and shipped in powdered form until they are reconstituted into a milk like drink.

The problem with some of these none milk products and some milk products as well is that if they are stored for a period of time after being reconstituted into a liquid product, they tend to settle out. That is, the powder when mixed with water will remain in suspension for only a period of time. This has been addressed in some cases by adding suspension agents which extend the life time of such products. Usually, these products may not be processed like milk. For example, pasteurization of the reconstituted liquid causes the suspended particles to settle out of solution and collect at the bottom of the container. Typically, flavoring and other additives settle out and the container needs to be shaken periodically to reintroduce the settled ingredients.

The instant invention solves the foregoing problems and allows not only the storage and shipment of such products in a dry form but when the same is reconstituted into a liquid product, it may be processed like any milk product and subjected to the heat required for pasteurization. In addition, the ingredients do not settle out even after extended storage. This extends the shelf life of the reconstituted liquid once placed in the container and pasteurized and does not require repeated shaking to again introduce the ingredients into suspension.

SUMMARY OF THE INVENTION

The instant invention is a powdered milk substitute with the taste and processing characteristics of milk but without lactose. It may, as has been pointed out, be stored and shipped in either a dry or liquid form. Further when the ingredients are reconstituted into a liquid form the mixture may be processed like any milk product and subjected to the heat required for pasteurization without the suspended ingredients settling out, thereby permitting an extended shelf life of the reconstituted liquid. In addition, the liquid not require shaking to maintain the ingredients in suspension.

It comprises a low calorie, low fat, and a non-fat version, with a vitamin A added replacement for milk.

The instant invention comprises a mixture of whey, partially hydrogenated oil, corn syrup solids, a stabilizer emulsifier, and other ingredients which resists high temperature breakdown during pasteurization.

The product composition may be varied to produce a non-fat version in accordance with USDA regulations, a flavored version (such as a chocolate drink) and a regular version each of which is of a high temperature variety which permits pasteurization or sterilization by heat. All embodiments of the formula are free of saturated fats.

DETAILED DESCRIPTION OF THE SPECIFIC EMBODIMENTS

There are several specific embodiments as noted above. While the specific embodiments are described, it is not intended that the scope of this invention be limited to such embodiments but shall be as broad as the claims will allow. In addition, some variation of the formulation is permitted within the indicated ranges. The formulation described in accordance with the present invention is presented in a dry mix which when combined with water will forma milk or cream like mixture suitable as a healthful beverage which is low in polyunsaturated fat, free of cholesterol, low in calories and containing little or no lactose. The instant invention based upon non-dairy creamers such as taught in U.S. Pat. No. 4,046,926, which is incorporated herein by reference and other creamers which by way of example typically include by weight; a partially hydrogenated oil of approximately 50%, corn syrup solids of approximately 20%, sodium caseinate of approximately 10%, Mono and diglycerides of approximately 8%, dipotasium phosphate of approximately 2%, sodium silocoluminate of approximately 2.5% and lecithin of approximately 2.5%. Such non-dairy creamers may be used to supply the primary ingredients for the instant invention with the addition of other elements as noted herein. A useful non-dairy creamer for this purpose would be RICHMIX*B-7 (CW143) available from AC Humko, Memphis, Tenn. For a fat free version a useful non-dairy creamer would be RICHMIX*LD FAT FREE (CW213). However, non-dairy creamers are generally not suitable for beverage purposes due to the high fat content as noted in U.S. Pat. No. 4,446,164 page 2, line 56 through 61. However, the instant invention includes a combination of ingredients which when combined with significant amount of non-dairy creamer is suitable as a beverage and permits the use of the above RICHMIX versions. The instant invention is however, not limited to the use of non-dairy creamers but is drawn to the range of percentage of the various ingredients described herein. The instant invention differs from the frozen dessert described in U.S. Pat. No. 5,478,587 in that the beverage of the instant invention is specifically formulated to withstand high temperature processing. It has been discovered through experimentation that the addition of a high temperature stabilizer emulsifier combination, such as RECODAN CM from Danisco, located in New Century, Kans. RECODAN CM comprises a Mono and diglycerides, carrageenan gum and guar gum formulation. For the stabilizer emulsion to maintain the ingredients in suspension after heating additional ingredient is added to act as a catalyst during heating. This additional ingredient is tetrasodium pyrophosphate a buffered salt. This combination results in the high heat resistance of the combined product.

The specific range of heat which may be applied to the combined ingredients when reconstituted in water is from about 120 to about 350 degrees Fahrenheit with existing equipment. The highest range of heat tolerance has not been determined. In processing the product of the instant invention may be heated to a temperature of 285 degrees for 4 seconds which makes the product an Extended shelf life product (ESL) good for at least 60 days refrigerated. When aseptic packaging the product is heated to 285 degrees for 6.5 seconds which permits a shelf life of at least 6 months.

The specific formulations discussed below are in dry form. In order to make a beverage, from 40% to 80% water should be added. 60% to 65% is preferred with 64% being considered ideal.

By way of example, and not intended to be limitation, the following specific examples of various formulations of the ingredients forming the milk like product are shown in the following Examples.

EXAMPLE 1

Ultra High Temperature Milk Replacement

| Ingredients | Preferred % About | Range of % About From–To |
|---|---|---|
| Whey | 29.00 | 20–40 |
| Partially Hydrogenated Canola Oil | 22.50 | 10–35 |
| Corn Syrup Solids | 18.00 | 5–30 |
| Sugar | 13.00 | 5–30 |
| Whey Protein Concentrate | 8.50 | 1–20 |
| RECODAN(Stabilizer) | 2.00 | .5–10 |
| Tetrasodium Pyrophosphate | 1.30 | .5–3 |
| Calcium Carbonate | 1.20 | .5–3 |
| Sodium Caseinate | 1.125 | .5–3 |
| Mono & Diglycerides | 1.125 | .5–3 |
| Dipotassium Phosphate | 1.125 | .5–3 |
| Sodium Silicoaluminate | 0.675 | .2–3 |
| Soy Lecithin | 0.45 | .1–2.5 |

EXAMPLE 2

Ultra High Temperature Fat Free Milk Replacement

Milk Replacement

| Ingredients | Preferred % About | Range of % About From–To |
|---|---|---|
| Whey | 32.50 | 20–40 |
| Corn Syrup Solids | 18.40 | 5–30 |
| Sugar | 16.52 | 8–30 |
| Partially Hydrogenated Soy Bean Oil | 16.10 | 10–35 |
| Whey Protein Concentrate | 5.00 | 1–20 |
| RECODAN(Stabilizer) | 2.00 | .5–10 |
| Sodium Casenate | 1.15 | .5–3 |
| Dipotassium Phosphate | 1.15 | .5–3 |
| Maltodextrin | 1.15 | .5–3 |
| Titanium Dioxide | 1.00 | .2–3 |
| Tetrasodium Pyrophosphate | 1.00 | .5–3 |
| Calcium Carbonate | 1.00 | .5–3 |
| Artificial Color | 0.69 | .2–3 |
| Sodium Silicoaluminate | 0.46 | .1–2.5 |
| Mono & Diglycerides | 0.46 | .1–2.5 |
| Vanillin | 0.40 | .1–2.5 |
| Artificial Flavor | 0.345 | .1–2 |
| Carrageenan Gum | 0.345 | .1–2 |
| Salt | 0.23 | .05–2 |
| Guar Gum | 0.10 | .02–2 |

EXAMPLE 3

Ultra High Temperature Chocolate Milk Replacement

| Ingredients | Preferred % About | Range of % About From–To |
|---|---|---|
| Sugar | 48.00 | 20–60 |
| Whey | 19.00 | 20–40 |
| Partially Hydrogenated Canola Oil | 10.00 | 10–35 |
| Corn Syrup Solids | 8.00 | 5–30 |
| Cocoa | 6.00 | 2.5–20 |
| RECODAN(Stabilizer) | 2.00 | .5–10 |
| Whey Protein Concentrate | 2.00 | 1–20 |
| Tetrasodium Pyrophosphate | 1.00 | .5–3 |
| Salt | 0.74 | .3–3 |
| Vanillin | 0.50 | .1–2.5 |

Ultra High Temperature Chocolate Milk Replacement -continued

| Ingredients | Preferred % About | Range of % About From–To |
|---|---|---|
| Sodium Casenate | 0.50 | .1–2.5 |
| Mono & Diglycerides | 0.50 | .1–2.5 |
| Dipotassium Phosphate | 0.50 | .1–2.5 |
| Guar Gum | 0.38 | .05–2 |
| Calcium Carbonate | 0.38 | .05–2 |
| Sodium Silicoaluminate | 0.30 | .05–2 |
| Soy Lecithin | 0.20 | .1–2.5 |

EXAMPLE 4

Ultra High Temperature Milk Replacement Non-Dairy Creamer

| Ingredients | Preferred % About | Range of % About From–To |
|---|---|---|
| Non Dairy Creamer | 45 | 15–65 |
| Whey | 29.00 | 10–45 |
| Sugar | 13.00 | 5–30 |
| Whey Protein Concentrate | 8.50 | 1–20 |
| RECODAN(Stabilizer) | 2.00 | .5–10 |
| Tetrasodium Pyrophosphate | 1.30 | .5–3 |
| Calcium Carbonate | 1.20 | .5–3 |

EXAMPLE 5

Ultra High Temperature Fat Free Milk Replacement Milk Replacement Non-Dairy Creamer

| Ingredients | Preferred % About | Range of % About From–To |
|---|---|---|
| Non Dairy Creamer | 40.48 | 20–60 |
| Whey | 32.50 | 20–40 |
| Sugar | 16.52 | 5–30 |
| Whey Protein Concentrate | 5.00 | 2–10 |
| RECODAN(Stabilizer) | 2.00 | .5–10 |
| Titanium Dioxide | 1.00 | .5–3 |
| Tetrasodium Pyrophosphate | 1.00 | .5–3 |
| Calcium Carbonate | 1.00 | .5–3 |
| Vanillin | 0.40 | .02–3 |

EXAMPLE 6

Ultra High Temperature Chocolate Milk Replacement Non-Dairy Creamer

| Ingredients | Preferred % About | Range of % About From–To |
|---|---|---|
| Non Dairy Creamer | 20.00 | 5–35 |
| Sugar | 48.00 | 15–65 |
| Whey | 19.00 | 20–40 |
| Cocoa | 6.00 | 2–10 |
| RECODAN(Stabilizer) | 2.00 | .5–10 |

-continued

Ultra High Temperature
Chocolate Milk Replacement
Non-Dairy Creamer

| Ingredients | Preferred % About | Range of % About From–To |
|---|---|---|
| Whey Protein Concentrate | 2.00 | 2–10 |
| Tetrasodium Pyrophosphate | 1.00 | .5–3 |
| Salt | 0.74 | .02–4 |
| Vanillin | 0.50 | .01–4 |
| Calcium Carbonate | 0.38 | .01–4 |

Variations and modifications of the above described invention will be apparent to those skilled in the art of manufacturing milk substitutes and milk like products and beverages and such are to be included within the scope of this invention.

Having thus described the invention what is claimed is:

1. A heat resistant milk substitute comprising a mixture of:
   a. whey in the range of about 10% to about 45% by dry weight of said mixture;
   b. a sweetener;
   c. a catalyst to maintain ingredients in suspension after heat processing in the range of 0.5% to 3% by dry weight of said mixture comprising tetrasodium pyrophosphate; and
   d. a stabilizer emulsifier.

2. A milk substitute mixture as described in claim 1 wherein by dry weight of said mixture,
   a. said whey is in the range of about 10% to about 45%;
   b. said sweetener is corn syrup solids in the range of about 5% to about 30%;
   c. said catalyst is tetrasodium pyrophosphate in the range of about 0.5% to about 3%; and
   d. said stabilizer emulsifier is a high temperature stabilizer emulsifier in the range of about 0.5% to about 10%.

3. A milk substitute mixture as described in claim 2 including an unsaturate oil.

4. A milk substitute mixture as described in claim 3 wherein said unsaturate oil is partially hydrogenated Canola oil in the range of about 10% to about 35%.

5. A heat resistant milk substitute mixture comprising by weight before combining with a liquid:
   a. whey in the range of about 10% to about 45%;
   b. partially hydrogenated canola oil of about 10% to 35%;
   c. corn syrup solids of about 5% to about 30%;
   d. sugar of about 5% to about 30%;
   e. whey protein concentrate of about 1% to about 20%;
   f. tetrasodium pyrophosphate of about 0.5% to about 3%;
   g. calcium carbonate of about 0.5% to about 3%;
   h. sodium caseinate of about 0.5% to about 3%;
   i. Mono & Diglycerides of about 0.5% to about 3%;
   j. dipotassium phosphate of about 0.5% to about 3%;
   k. sodium silicoaluminate of about 0.2% to about 3%;
   l. soy lecithin of about 0.1% to about 2.5%; and
   m. A stabilizer emulsifier in the range of about 0.5% to about 10%.

6. A heat resistant milk substitute mixture as described in claim 5 comprising the following:
   a. whey of about 29.00%;
   b. partially hydrogenated canola oil of about 22.50%;
   c. corn syrup solids of about 18.00%;
   d. sugar of about 13.00%;
   e. whey protein concentrate of about 8.50%;
   f. tetrasodium pyrophosphate of about 1.30%;
   g. calcium carbonate of about 1.20%;
   h. sodium caseinate of about 1.125%;
   i. mono & diglycerides of about 1.125%;
   j. dipotassium phosphate of about 1.125%;
   k. sodium silicoaluminate of about 0.675%; and
   l. soy lecithin of about 0.45%;
   m. A stabilizer emulsifier in the range of about 0.5% to about 10%.

7. A heat resistant milk substitute mixture comprising by weight before combining with a liquid:
   a. whey in the range of about 10% to about 45%;
   b. Partially Hydrogenated Soy Bean Oil in the range of about 10% to about 35%;
   c. corn syrup solids in the range of about 5% to about 30%;
   d. sugar in the range of about 8% to about 30%;
   e. whey protein concentrate in the range of about 1% to about 20%;
   f. a stabilizer emulsifier in the range of about 0.5% to about 10%;
   g. tetrasodium pyrophosphate in the range of about 0.5% to about 3%;
   h. calcium carbonate in the range of about 0.5% to about 3%;
   i. sodium caseinate in the range of about 0.5% to about 3%;
   j. mono & diglycerides in the range of about 0.1% to about 2.5%;
   k. vanillin in the range of about 0.1% to about 2.5%;
   l. Carrageenan Gum in the range of about 0.1% to about 2%;
   m. dipotassium phosphate in the range of about 0.5% to about 3%;
   n. Maltodextrin in the range of about 0.5% to about 3%;
   o. Titanium Dioxide in the range of about 0.2% to about 3%;
   p. salt in the range of about 0.05% to about 2%;
   q. sodium silicoaluminate in the range of about 0.1% to about 2.5%; and
   r. guar gum in the range of about 0.02% to about 2%.

8. A heat resistant milk substitute mixture as described in claim 7 comprising the following:
   a. whey of about 32.50%;
   b. Partially Hydrogenated Soy Bean Oil of about 16.10%;
   c. corn syrup solids of about 18.40%;
   d. sugar of about 16.52%;
   e. whey protein concentrate of about 5.00%;
   f. a stabilizer emulsifier of about 2.00%;
   g. tetrasodium pyrophosphate of about 1.00%
   h. calcium carbonate of about 1.00%
   i. sodium caseinate of about 1.15%;
   j. mono & diglycerides of about 0.46%
   k. vanillin of about 0.40%
   l. Carrageenan Gum of about 0.345%
   m. dipotassium phosphate of about 1.15%;

n. Maltodextrin of about 1.15%
o. Titanium Dioxide of about 1.00%
p. salt of about 0.23%;
q. Carrageenan Gum of about 0.345%
r. sodium silicoaluminate of about 0.46%; and
s. guar gum of about 0.10%.

9. A heat resistant milk substitute mixture as described in claim 8 further comprising
Artificial Color in the range of 0.2% to about 3%; and
Artificial Flavor in the range of 0.1% to about 2%.

10. A heat resistant milk substitute mixture comprising by weight before combining with a liquid:
   a. whey in the range of about 10% to about 45%;
   b. partially hydrogenated canola oil in the range of about 10% to about 35%;
   c. corn syrup solids in the range of about 5% to about 30%;
   d. cocoa in the range of about 2.5% to about 20%;
   e. a stabilizer emulsifier in the range of about 0.5% to about 10%;
   f. sugar in the range of about 20% to about 60%;
   g. whey protein concentrate in the range of about 1% to about 20%;
   h. tetrasodium pyrophosphate in the range of about 0.5% to about 3%;
   i. salt in the range of about 0.3% to about 3%;
   j. vanillin in the range of about 0.1% to about 2.5%;
   k. calcium carbonate in the range of about 0.05% to about 2%;
   l. sodium caseinate in the range of about 0.1% to about 2.5%;
   m. mono & diglycerides in the range of about 0.1% to about 2.5%;
   n. dipotassium phosphate in the range of about 0.1% to about 2.5%;
   o. guar gum in the range of about 0.05% to about 2%;
   p. sodium silicoaluminate in the range of about 0.05% to about 2%; and
   q. soy lecithin in the range of about 0.1% to about 2.5%.

11. A heat resistant milk substitute mixture as described in claim 10 comprising the following:
   a. whey of about 19.00%;
   b. partially hydrogenated canola oil of about 10.00%;
   c. corn syrup solids of about 8.00%;
   d. cocoa of about 6.00%;
   e. a stabilizer emulsifier of about 2.00%;
   f. sugar of about 48.00%;
   g. whey protein concentrate of about 2.00%;
   h. tetrasodium pyrophosphate of about 1.00%;
   i. salt of about 0.74%;
   j. vanillin of about 0.50%;
   k. calcium carbonate of about 0.38;
   l. sodium caseinate of about 0.50%;
   m. mono & diglycerides of about 0.50%;
   n. dipotassium phosphate of about 0.50%;
   o. guar gum of about 0.38%;
   p. sodium silicoaluminate of about 0.30%; and
   q. soy lecithin of about 0.20%.

12. A heat resistant milk substitute comprising a mixture of:
   a. a noin-dairy creamer;
   b. a sweetener
   c. a stabilizer emulsifier and
   d. a catalyst to maintain ingredients in suspension after heat processing.

13. A heat resistant milk substitute as described in claim 12 wherein said catalyst is Tetrasodium Pyrophosphate.

14. A heat resistant milk substitute mixture comprising by weight before combining with a liquid:
   a. Non Dairy Creamer in the range of about 15% to about 65%;
   b. Whey in the range of about 10% to about 45%;
   c. Sugar in the range of about 5% to about 30%;
   d. Whey Protein Concentrate in the range of about 1% to about 20%;
   e. a stabilizer in the range of about 0.5% to about 10%;
   f. Tetrasodium Pyrophosphate in the range of about 0.5% to about 3%; and
   g. Calcium Cabonate in the range of about 0.5% to about 3%.

15. A heat resistant milk substitute mixture as described in claim 14 comprising the following:
   a. Non Dairy Creamer of about 45%;
   b. Whey of about 29.00%;
   c. Sugar of about 13.00%;
   d. Whey Protein Concentrate of about 8.50%;
   e. a stabilizer of about 2.00%;
   f. Tetrasodium Pyrophosphate of about 1.30%; and
   g. Calcium Carbonate of about 1.20%.

16. A heat resistant milk substitute mixture comprising by weight before combining with a liquid:
   a. Non Dairy Creamer in the range of about 20% to about 60%;
   b. whey in the range of about of about 10% to about 45%;
   c. sugar in the range of about of about 5% to about 30%;
   d. whey protein concentrate in the range of about 2% to about 10%;
   e. a stabilizer emulsifier in the range of about 0.5% to about 10%;
   f. Titanium Dioxide in the range of about 0.5% to about 3%;
   g. tetrasodium pyrophosphate in the range of about 0.5% to about 3%;
   h. calcium carbonate in the range of about 0.5% to about 3%; and
   i. vanillin in the range of about 0.02% to about 3%.

17. A heat resistant milk substitute mixture as described in claim 16 comprising the following:
   a. Non Dairy Creamer of about 40.48%;
   b. whey of about 32.50%;
   c. sugar of about 16.52%;
   d. whey protein concentrate of about 5.00%;
   e. a stabilizer emulsifier of about 2.00%;
   f. Titanium Dioxide of about 1.00%;
   g. tetrasodium pyrophosphate of about 1.00%;
   h. calcium carbonate of about 1.00%; and
   i. vanillin of about 0.40%.

18. A heat resistant milk substitute mixture comprising by weight before combining with a liquid:
   a. Non Dairy Creamer in the range of about 5% to about 35%;

b. sugar in the range of about 15% to about 65%;
c. whey in the range of about 10% to about 45%;
d. Cocoa in the range of about 2% to about 10%;
e. a stabilizer emulsifier in the range of about 0.5% to about 10%;
f. whey protein concentrate in the range of about 2% to about 10%;
g. tetrasodium pyrophosphate in the range of about 0.5% to about 3%;
h. salt in the range of about 0.02% to about 4%;
i. vanillin in the range of about 0.01% to about 4%; and
j. calcium carbonate in the range of about 0.01% to about 4%.

19. A heat resistant milk substitute mixture as described in claim 18 comprising the following:

a. Non Dairy Creamer of about 20.00%;
b. sugar of about 48.00%;
c. whey of about 19.00%;
d. Cocoa of about 6.00%;
e. a stabilizer emulsifier of about 2.00%;
f. whey protein concentrate of about 2.00%;
g. tetrasodium pyrophosphate of about 1.00%;
h. salt of about 0.74%;
i. vanillin of about 0.50%; and
j. calcium carbonate of about 0.38%.

* * * * *

UNITED STATES PATENT AND TRADEMARK OFFICE
CERTIFICATE OF CORRECTION

PATENT NO.    : 6,020,017
DATED         : February 1, 2000
INVENTOR(S)   : Mingione, Armand Page 1 of 1

It is certified that error appears in the above-identified patent and that said Letters Patent is hereby corrected as shown below:

Column 8,
Line 1, correct the spelling of "noin-dairy creamer" to read -- non-dairy creamer --.

Signed and Sealed this

Twelfth Day of October, 2004

JON W. DUDAS
*Director of the United States Patent and Trademark Office*

Disclaimer 6,020,017—Armand Mingione, Escondido, Ca. NON-DAIRY DRINK MIXTURE. Patent dated Feb. 1, 2000. Disclaimer filed Oct. 14, 2004, by the inventor.

Hereby disclaims the entire term of said patent.

*(Official Gazette March 15, 2005)*